United States Patent
Duet et al.

(10) Patent No.: US 9,918,139 B2
(45) Date of Patent: Mar. 13, 2018

(54) DISTRIBUTED ARCHITECTURE FOR MOBILE STREAMING CONTENT DELIVERY

(71) Applicant: AT&T INTELLECTUAL PROPERTY I, L.P., Atlanta, GA (US)

(72) Inventors: Douglas A. Duet, Roswell, GA (US); Melvin D. Frerking, Eastman, GA (US); Yuang Lou, Dunwoody, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 14/793,172

(22) Filed: Jul. 7, 2015

(65) Prior Publication Data
US 2017/0013299 A1    Jan. 12, 2017

(51) Int. Cl.
*H04N 21/61*     (2011.01)
*H04N 21/2343*   (2011.01)
*H04N 21/239*    (2011.01)

(52) U.S. Cl.
CPC ..... *H04N 21/6143* (2013.01); *H04N 21/2343* (2013.01); *H04N 21/2393* (2013.01); *H04N 21/6131* (2013.01)

(58) Field of Classification Search
CPC ....... H04N 21/41407; H04N 21/26258; H04N 21/242; H04N 21/6408; H04N 21/2343; H04N 21/2393; H04N 21/6143; H04N 21/6131; H04N 21/234309; H04N 21/2381; H04N 21/6193; H04N 7/17354; H04W 74/006
See application file for complete search history.

(56) References Cited

U.S. PATENT DOCUMENTS

| | | | |
|---|---|---|---|
| 5,697,066 A * | 12/1997 | Acampora | H01Q 3/2605 370/346 |
| 9,420,354 B2 * | 8/2016 | Kotecha | H04N 21/84 |
| 2002/0078451 A1 * | 6/2002 | Nishina | H04N 7/165 725/43 |
| 2007/0283386 A1 * | 12/2007 | Hatayama | H04N 7/17336 725/34 |

(Continued)

*Primary Examiner* — Benjamin R Bruckart
*Assistant Examiner* — Tien M Nguyen
(74) *Attorney, Agent, or Firm* — Akerman LLP; Michael K. Dixon; Mammen (Roy) P. Zachariah, Jr.

(57) ABSTRACT

A system for providing a distributed architecture for mobile streaming content delivery is disclosed. In particular, the system may include bypassing a master head end facility and its accompanying fiber distribution network to deliver a content stream directly to mobile cell sites. In order to do so, the system may receive, at a cell cite, a content stream directly from a content satellite and then format the content into a format suitable for delivery to a subscriber device. The system may receive, such as via a radio access network, a request from the subscriber device to access the content stream. In response to the request from the subscriber device, the system may deliver the formatted content stream to the subscriber device. The distributed architecture may also allow for delivering the content stream jointly with voice data services, such as those provided in a Long-Term Evolution network or other network.

20 Claims, 6 Drawing Sheets

(56) References Cited

U.S. PATENT DOCUMENTS

| | | | |
|---|---|---|---|
| 2008/0153460 A1* | 6/2008 | Chan | H04W 4/12 |
| | | | 455/412.1 |
| 2008/0195664 A1* | 8/2008 | Maharajh | G06F 17/30035 |
| 2008/0305834 A1* | 12/2008 | Janiszewski | H04N 7/17354 |
| | | | 455/561 |
| 2010/0120415 A1* | 5/2010 | Urquhart | H01Q 1/1257 |
| | | | 455/424 |
| 2010/0195760 A1* | 8/2010 | Weiss | H04N 5/38 |
| | | | 375/295 |

* cited by examiner

DISTRIBUTED ARCHITECTURE FOR MOBILE STREAMING CONTENT DELIVERY

FIELD OF THE INVENTION

The present application relates to technologies for content distribution networks and network architecture, and more particularly, to a distributed architecture for mobile streaming content delivery.

BACKGROUND

In today's society, end users regularly utilize network and other service providers to gain access to the Internet, access software services, request and receive various types of content, access software applications, and perform a variety of other tasks and functions. In order to serve content and provide services to the end users in a more efficient and effective manner, network and service providers often utilize content delivery networks and systems to distribute such content and services. Content delivery networks and systems often provide high performance, reliability, scalability, and cost savings associated with distributing and providing content and services to end users. As a result, content delivery networks have become increasingly popular for delivering various types of media content, such as video content and audio content, to fixed and mobile devices.

Currently, content delivery networks typically employ the use of terrestrial-based facilities, such as master head end facilities, to gather content from a wide variety of content sources. Such master head end facilities format the gathered content and provide a properly formatted content stream to individual subscribers via a distribution network. The master head end facilities can provide the content streams to vast areas, such as, but not limited to, states, large territories, and other similarly-sized areas, and the coverage provided is typically only limited by the cost of the distribution facilities. While such master head end facilities provide substantial functionality and services, they require complex content formatting and delivery systems to handle the delivery of content to multiple points of distribution. Additionally, master head end facility equipment is capital intensive, and the networks that distribute the formatted content to the individual cell sites have a substantial impact on operating expenses. When master head end facilities are deployed in built-up areas or cities, utilizing wired cable distribution often involves complex configurations that require high costs for providing wired installations. As a result, enhancing and improving content delivery networks may provide for improved customer satisfaction, increased revenue for content providers, and reduced costs associated with delivering content to users.

SUMMARY

A system and accompanying methods for providing a distributed architecture for mobile streaming content delivery are disclosed. In particular, the system and methods may include providing a distributed network architecture that bypasses master head end facilities and their accompanying wired networks to deliver content streams directly to mobile cell sites. Streaming services may be delivered to users by sharing the same or similar network coverage, network infrastructure, and radio frequency spectrum utilized in mobile networks. In order to accomplish this, the system and methods may involve utilizing a satellite-based architecture that utilizes one or more satellites to delivery content directly to each cell cite in a mobile network. In certain embodiments, each cell site may be equipped with a satellite receive antenna and a content controller server that interfaces with the radio access network at each cell to deliver content to mobile subscribers.

The satellite receive antenna may be configured to receive an incoming content stream from one or more satellites and may pass the content stream to the content controller server for processing. The content controller server may format the incoming content stream from the satellite receive antenna into a suitable format for delivery to mobile subscribers. For example, the content controller server may format the incoming content stream into a channel lineup, much like a set-top box on a cable television system, except that each channel in the lineup may be distributed to multiple mobile subscribers. The content controller server may accept, via the radio access network, requests for the content stream from mobile subscribers, and then feed the formatted content stream to subscriber devices of the mobile subscribers using the radio access network. The mobile subscribers may then interact with the content stream using the subscriber devices.

In one embodiment, a system for providing a distributed architecture for mobile streaming content delivery is disclosed. The system may include a memory that stores instructions and a processor that executes the instructions to perform various operations of the system. The system may perform an operation that includes receiving, at a cell site, a content stream directly from a content satellite. Notably, the content stream may be received from the content satellite without passing through a master head end facility or other similar structure. Once the content stream is received, the system may perform an operation that includes formatting the content stream received from the content satellite into a format suitable for delivery to a subscriber device. The system may then perform an operation that includes receiving, from the subscriber device, a request to access the content stream. In certain embodiments, the request to access the content stream may be received via a radio access network. Finally, the system may perform an operation that includes delivering, to the subscriber device, the content stream having the format suitable for delivery to the subscriber device in response to the request. In certain embodiments, the content stream may be delivered via the radio access network.

In another embodiment, a method for providing a distributed architecture for mobile streaming content delivery is disclosed. The method may include utilizing a memory that stores instructions, and a processor that executes the instructions to perform the various functions of the method. The method may include receiving, at a cell site, a content stream directly from a content satellite. The content stream may be received directly from the content satellite without passing through a master head end facility or other similar structure. Additionally, the method may include formatting the content stream received from the content satellite into a format suitable for delivery to a subscriber device. Furthermore, the method may include receiving, from the subscriber device, a request to access the content stream. In certain embodiments, the request to access the content stream may be received via a radio access network. Moreover, the method may include delivering, to the subscriber device and via the radio access network, the content stream having the format suitable for delivery to the subscriber device.

According to yet another embodiment, a computer-readable device having instructions for providing a distributed architecture for mobile streaming content delivery is provided. The computer instructions, which when loaded and executed by a processor, may cause the processor to perform operations including: receiving, at a cell site, a content stream directly from a content satellite, wherein the content stream is received from the content satellite without passing through a master head end facility; formatting the content stream received from the content satellite into a format suitable for delivery to a subscriber device; receiving, from the subscriber device, a request to access the content stream, wherein the request to access the content stream is received via a radio access network; and delivering, to the subscriber device and via the radio access network, the content stream having the format suitable for delivery to the subscriber device.

These and other features of the systems and methods for providing a distributed architecture for mobile streaming content delivery are described in the following detailed description, drawings, and appended claims.

DETAILED DESCRIPTION OF THE INVENTION

Figure 1:
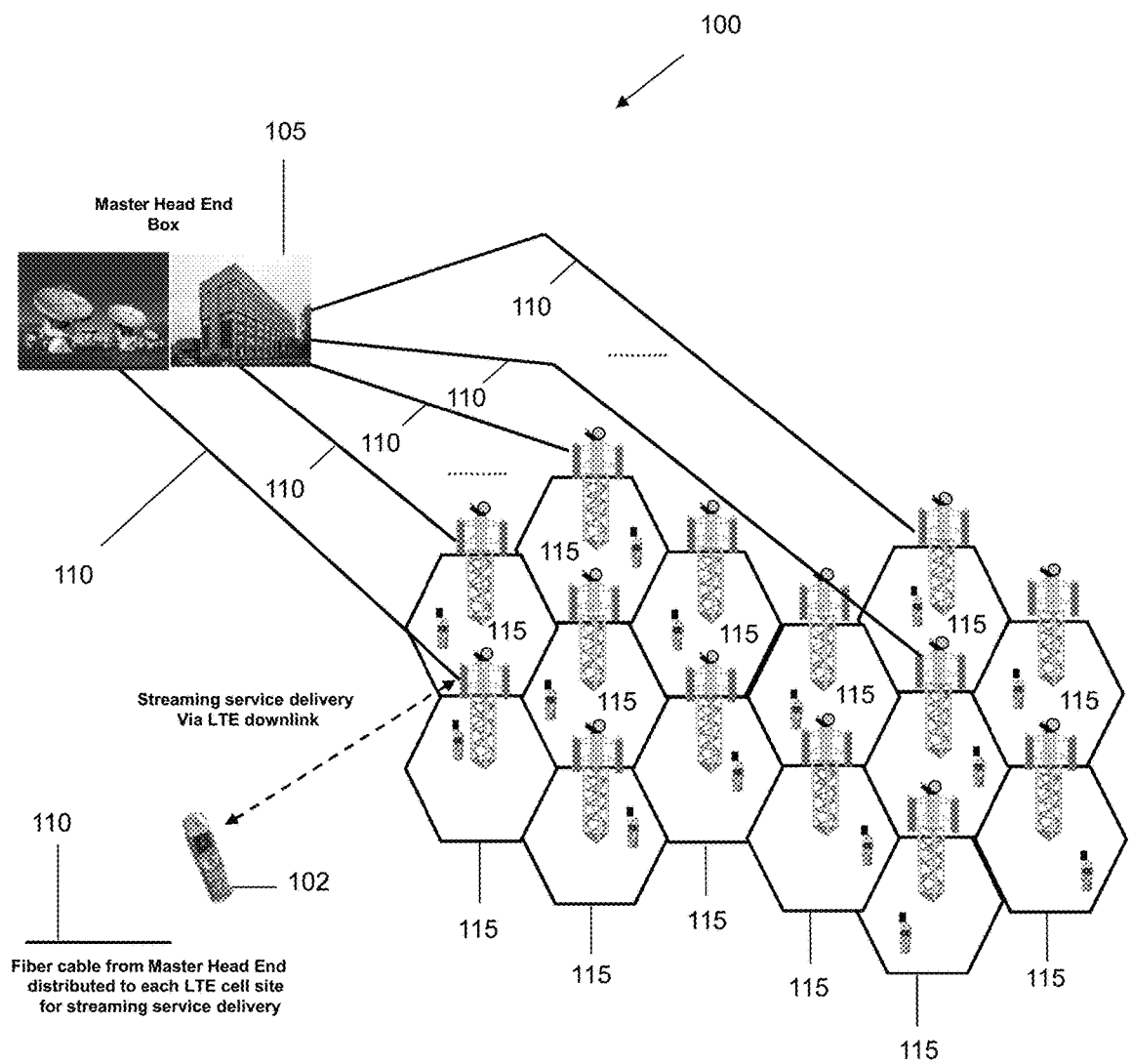
FIG. 1 is a schematic diagram of a traditional content delivery architecture that involves utilizing a master head end facility that includes a fiber distribution network to deliver content to users.

A system 200 and accompanying methods for providing a distributed architecture for mobile streaming content delivery are disclosed, as shown in FIG. 2-6. In particular, the system 200 and methods may involve providing a distributed network architecture that bypasses master head end facilities 105 and their accompanying wired distribution networks to deliver content streams directly to mobile cell sites. Streaming content services may be delivered to users 201, 210 by sharing the same or similar network coverage, network infrastructure, and radio frequency spectrum utilized in mobile networks. In order to accomplish this, the system 200 and methods may involve utilizing a satellite-based architecture that utilizes one or more satellites 232, 233 to deliver content directly to each cell cite 218 in a mobile network. In certain embodiments, each cell site 218 may be equipped with a satellite receive antenna 221 and a content controller server 223 that interfaces with the radio access network (RAN) 215 at each cell site 218 to deliver content to mobile subscribers, such as users 201, 210.

The satellite receive antenna 221 may be configured to receive an incoming content stream from one or more satellites 232, 233, and may pass the content stream to the content controller server 223 for processing. The content controller server 223 may format the incoming content stream from the satellite receive antenna 221 into a suitable format for delivery to mobile subscribers. For example, the content controller server 223 may format the incoming content stream into a channel lineup, much like a set-top box on a cable television system, except that each channel in the lineup may be distributed to multiple mobile subscribers. The content controller server 223 may accept, via the RAN 215, requests for the content stream from mobile subscribers, and then feed the formatted content stream to subscriber devices of the mobile subscribers using the RAN 215. The mobile subscribers may then interact with the content stream using the subscriber devices, such as first and second user devices 202, 211.

As shown in FIG. 1, a traditional system 100 for delivering content by utilizing a master head end facility 105 is illustrated. The traditional system 100 includes a master head end facility 105, along with fiber cable 110 from the master head end facility 105 that is distributed to each cell site 115 for providing streaming service delivery to one or more user devices 102 in the system 100. During operation, the traditional system 100 employs the master head end facility 105 to gather content from a wide variety of sources, format the gathered content, and deliver the formatted content to individual subscribers (e.g. user device 102) via a fiber distribution network connected to the master head end facility 105. Typically, the master head end facility 105 may employ complex video and audio formatting and delivery systems to handle the content delivery to the master head end facility's 105 many points of distribution.

Figure 2:
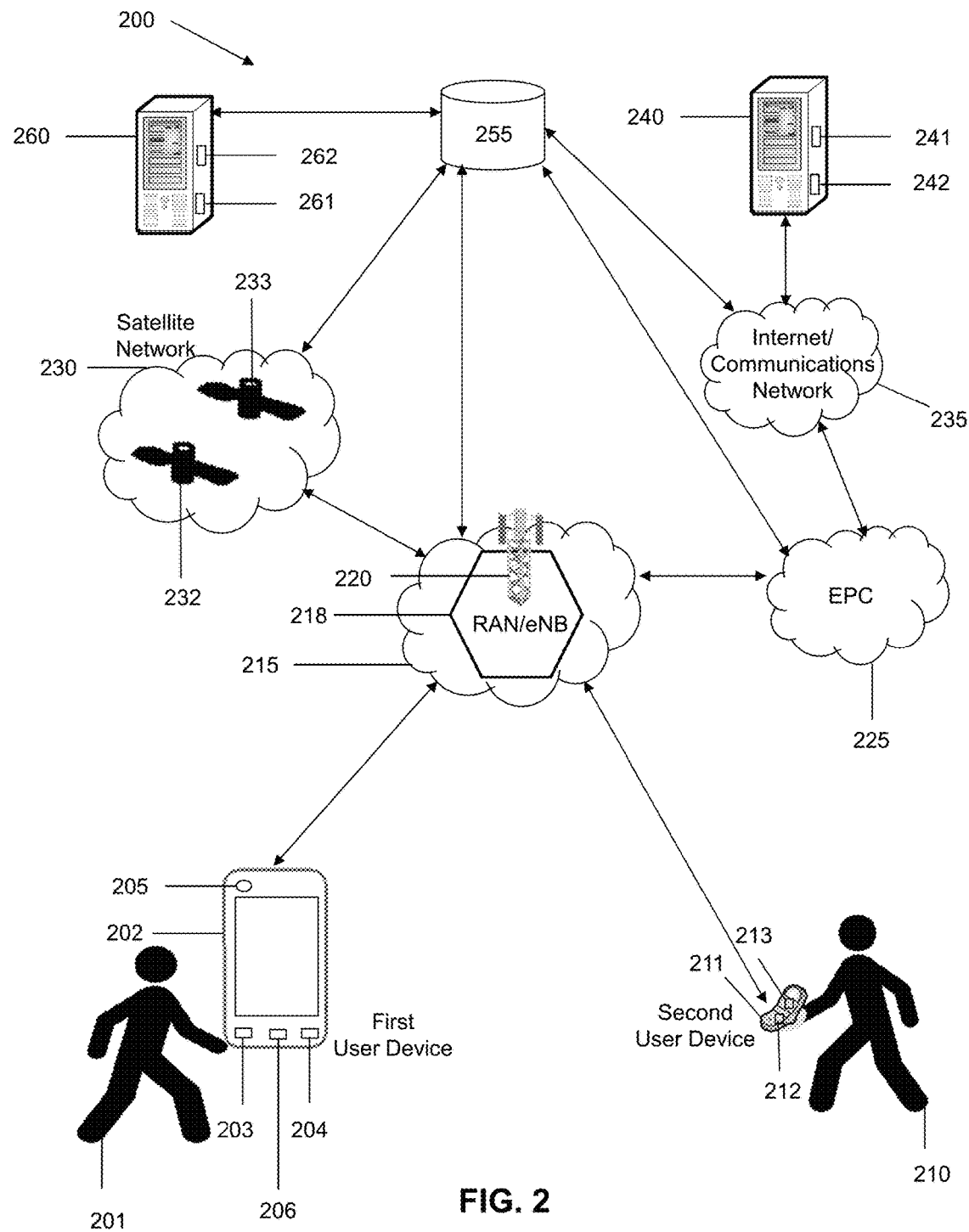
FIG. 2 is a schematic diagram of a system for providing a distributed architecture for mobile streaming content delivery according to an embodiment of the present disclosure.
Figure 3:
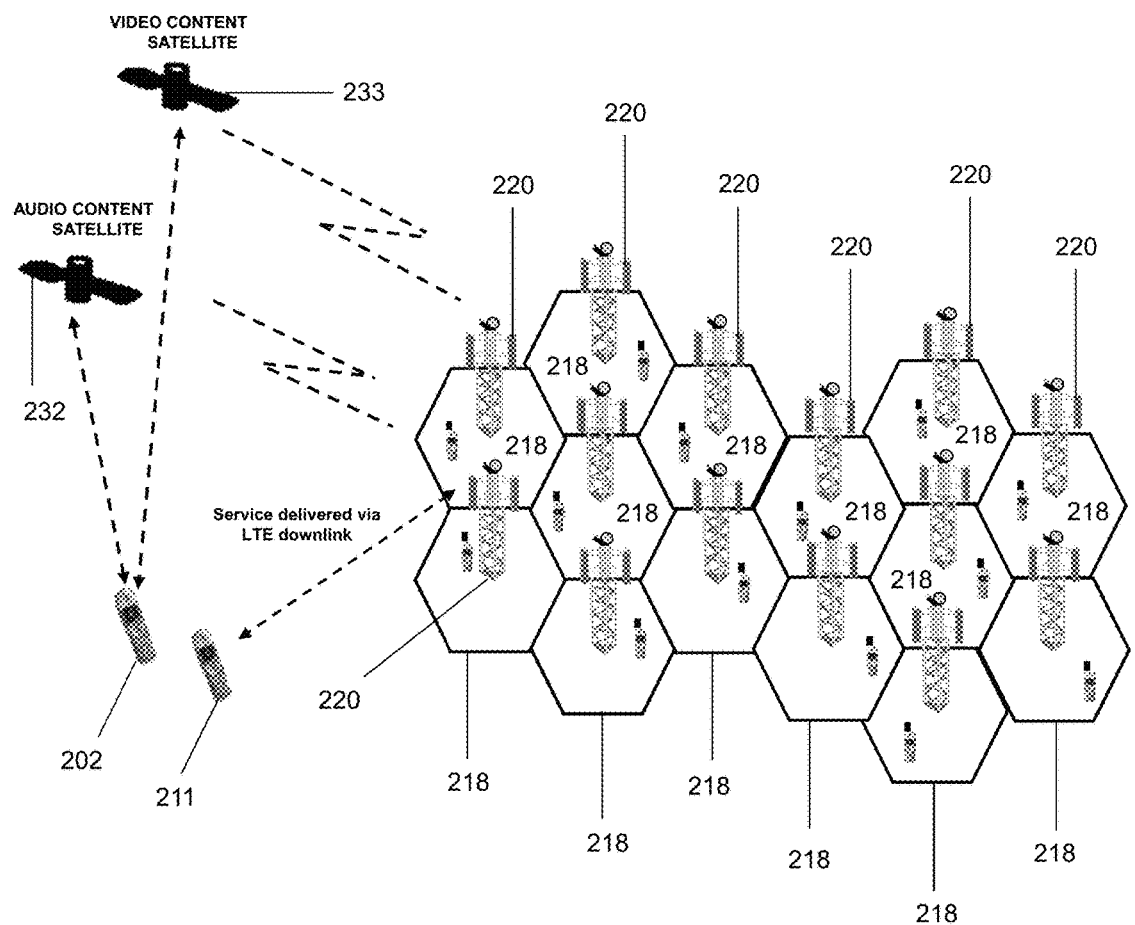
FIG. 3 is schematic diagram of a sample network architecture for use with the system of FIG. 2.
Figure 4:
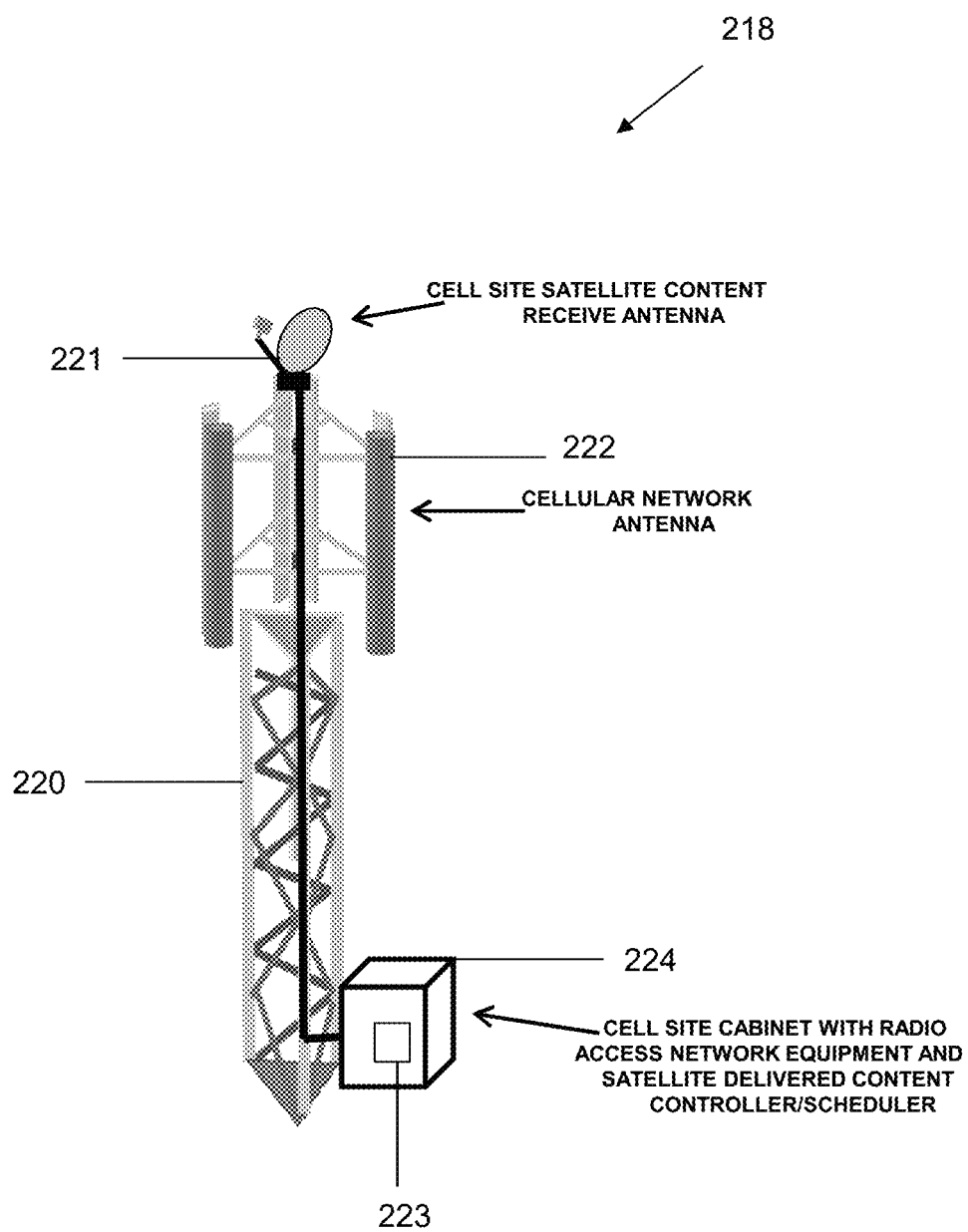
FIG. 4 is a sample cell site for use with the system and network architecture as provided in FIGS. 2 and 3.

In contrast to the system 100 provided in FIG. 1, a system 200 for providing a distributed architecture for mobile streaming content delivery that involves bypassing a master head end facility 105 is disclosed according to the present disclosure, which is shown in FIGS. 2-4. The system 200 may be configured to support, but is not limited to supporting, cloud computing services, content delivery services, satellite services, Long-Term Evolution services, telephone services, voice-over-internet protocol services (VoIP), software as a service (SaaS) applications, gaming applications and services, productivity applications and services, mobile applications and services, and any other computing applications and services. The system 200 may include a first user 201 that may utilize first user device 202 to access content, data, and services, to initiate and participate in communications sessions, or to perform a variety of other functions. As an example, the first user 201 may utilize first user device 202 to engage in a communications session, such as a telephone call or a chat session, with a second user 210 that may be utilizing second user device 211. As another example, the first user 201 may utilize the first user device 202 to request various types of media content from RAN 215, the EPC 225, the communications network 235, the satellite network 230, from the second user device 211, or a combination thereof.

In certain embodiments, the first user device 202 and second user device 211 may be computers, servers, mobile devices, smartphones, computer tablets, phablets, or any other computing devices. Illustratively, the first user device 202 is shown as a smartphone in FIG. 2. In one embodiment, the first user device 202 may include a memory 203 that includes instructions, and a processor 204 that executes the instructions from the memory 203 to perform various operations that are performed by the first user device 202. The processor 204 may be hardware, software, or a combination thereof. Additionally, the first user device 202 may include a camera 205, which may be utilized to capture video, image, or other content. Furthermore, the first user device 202 may also include a global positioning sensor 206 that may be configured to provide location information for the first user device 202 and location information for the first user 201 that is using the first user device 202. The second user device 211 may include a memory 212 that includes instructions, and a processor 213 that executes the instructions from the memory 212 to perform various operations that are performed by the second user device 211. The processor 213 may be hardware, software, or a combination thereof. Illustratively, second user device 211 is shown as a mobile device in FIG. 2.

The first user 201 and the second user 210 may utilize the first user device 202 and second user device 211, respectively, to participate in communications sessions with each other. Additionally, the first user 201 and the second user 210 may utilize the first user device 202 and the second user device 211 to access and obtain various types of content and services, such as, but not limited to, audio content, video content, web content, text content, any type of content, or any combination thereof. Furthermore, the first and second users 201, 210 may utilize the first and second user devices 202, 211 to perform a variety of other tasks and functions. In certain embodiments, the first user device 202 and second user device 211 may include software applications that may include a cloud-based application, gaming application, an internet-based application, a browser application, a mobile application, a productivity application, a video application, a music application, a streaming media application, a social media application, any other type of application, or a combination thereof. In certain embodiments, the software applications may include one or more graphical user interfaces for the first and second users 201, 210 so as to enable the first and second users 201, 210 to readily interact with the software applications. In certain embodiments, at least a portion of the software application may be configured to execute directly on the first user device 202 and second user device 211, however, in other embodiments, the software application may be configured to execute on the other devices and components in the system 200.

The system 200 may also be configured to include a hardware element 220, which may reside within each cell site 218 of a RAN 215. In certain embodiments, the RAN 215 may be configured to include any of the functional features of a traditional RAN. In certain embodiments, the hardware element 220 may include or comprise an eNodeB element, such as used in a Long Term Evolution network or other similar network, and may also include any number of processors and memories. The hardware element 220 may be configured to connect directly with the first and second user devices 202, 211 via the RAN 215. For example, the hardware element 220 may be configured to connect with the first and second user devices 201, 211 by receiving connection requests from the first and second user devices 210, 210 via the cellular network antenna 222. Additionally, the hardware element 220 may include any of the functionality of a base station utilized in mobile communication networks. Furthermore, the hardware element 220 may include a satellite content receive antenna 221, which may be configured to communicate with the content satellites 232, 233 and receive incoming content streams, data, and services coming from the content satellites 232, 233, the satellite network 230, or a combination thereof.

Moreover, the hardware element 220 may further include a content controller server 223 that may be housed within a cell site cabinet 224 located at each cell site 218. The cell site cabinet 224 may also include RAN 215 equipment, additional servers, or any other equipment. The content controller server 223 may include one or more processors and memories that may work in conjunction with each other to receive incoming content streams from the content satellites 232, 233 via the satellite content receive antenna 221. Once the content streams are received by the content controller server 223, the content controller server 223 may format the content stream into a format that is suitable for delivery to one or more subscriber devices, such as first and second user devices 202, 211. For example, the content stream may be formatted into a channel lineup much like a set-top-box utilized with a cable television, except that the content stream may be formatted such that the content stream may be distributed to more than one subscriber device. The content stream may be formatted for delivery to a Long Term Evolution architecture, formatted based on bandwidth restrictions associated with the first and second user devices 202, 211, formatted based on content types, formatted based on latency requirements for the system 200, formatted based on resolution requirements, formatted based on any requirement, and any combination thereof.

The content controller server 223 may be configured to receive requests for the content stream from the first and second user devices 202, 211 via the RAN 215 and cellular network antenna 222. Upon receiving requests for the content stream, the content controller server 223 may deliver the formatted content stream to the first and second user devices 202, 211 via the RAN 215, the cellular network antenna 222, or a combination thereof. In certain embodiments, the content controller server 223 may also be configured to jointly deliver the formatted content stream with voice data services, such as Long Term Evolution services, to each of the first and second user devices 202, 211. For example, the content controller server 223 may provide voice data services associated with a call that the first user 201 is engaged in, along with a content stream associated with a movie that the user wants to view on the first user device 202. In certain embodiments, the cell site 218 in conjunction with the content controller server 223 may utilize resource blocks associated with delivering Long Term Evolution or other similar services.

The system 200 may also include a plurality of networks 225, 230, 235. The network 225 may be an evolved packet core (EPC) network 225 that may be configured to serve as a core network in the system 200. The EPC network 225 may be configured to provide both a voice and data networking framework for connecting the first and second users 201, 210, such as on a Long Term Evolution network. In certain embodiments, the EPC network 225 may include any of the components and functionality found in traditional EPC networks 225, and may be configured to be communicatively linked with communications network 235. The network 230 may be a satellite network 230 that may utilize one or more content satellites 232, 233 to deliver media content and services that may be requested by the first and second users 201, 210. In FIGS. 2-3, content satellite 232 may be an audio content satellite utilized for providing audio content, and content satellite 233 may be a video satellite that may be utilized for providing video content. The content satellites 232, 233 may be configured provide content directly to each of the cell sites 218 without having to transmit the content to a master head end facility 105 or other similar facility. The satellite network 230 may include any of the components and functionality found in a traditional satellite network. The EPC network 225 and the satellite network 230 may be configured to communicatively link with each of the cell sites 218 via the hardware element 220.

The communications network 235 of the system 200 may be configured to link each of the devices in the system 200 to one another, and be configured to transmit, generate, and receive any information and data traversing the system 200. In one embodiment, the communications network 235 may include any number servers, databases, or other componentry. The communications network 235 may be configured to communicatively link with the RANs 215, the EPC network 225, the satellite network 230, the server 240, the database 255, and the server 260. The communications network 135 may also include and be connected to a cloud-computing network, a wireless network, an ethernet network, a satellite network, a broadband network, a cellular network, a private network, a cable network, the Internet, an internet protocol network, a multiprotocol label switching (MPLS) network, a content distribution network, or any combination thereof. In one embodiment, the communications network 235 may be part of a single autonomous system that is located in a particular geographic region, or be part of multiple autonomous systems that span several geographic regions.

Notably, the functionality of the system 200 may be supported and executed by using any combination of the servers 240 and 260. In certain embodiments, the server 240 may include a memory 241 that includes instructions, and a processor 242 that executes the instructions from the memory 241 to perform various operations that are performed by the server 240. The processor 242 may be hardware, software, or a combination thereof. In certain embodiments, the servers 240 and 260 may be network servers, routers, gateways, computers, mobile devices or any other suitable computing device. In certain embodiments, the server 240 may be communicatively linked to the communications network 235, the EPC network 225, any network, or any combination thereof. Additionally, in certain embodiments, the server 240 may store content streams, metadata identifying the content streams, information relating to requests for the content streams, any other information, or any combination thereof.

The database 255 of the system 200 may be utilized to store and relay information that traverses the system 200, cache content that traverses the system 200, store data about each of the devices in the system 200 and perform any other typical functions of a database. In certain embodiments, the database 255 may be connected to or reside within the RAN 215, the EPC network 225, the satellite network 230, the communications network 235, or a combination thereof. Additionally, the database 255 may include a processor and memory or be connected to a processor and memory to perform the various operation associated with the database 255. In certain embodiments, the database 255 may be connected to servers 240, 260, first user device 202, second user device 211, the cell sites 218, the content receive antenna 221, the cellular network antenna 222, the content controller server 223 the hardware element 220, or any combination thereof. The database 255 may also store information and metadata obtained from the system 200, store metadata and other information associated with the first and second users 201, 210, store user profiles associated with the first and second users 201, 210, store device profiles associated with the first and second user devices 202, 211, store location information, store communications traversing the system 200, store user preferences, store information associated with any device or signal in the system 200, store content streams, store information relating to requests for content, store information relating to patterns of usage relating to the first user device 202 and second user device 211, store any information traversing the system 200, or any combination thereof. Furthermore, the database 255 may be configured to process queries sent to it by any device in the system 200.

Operatively, the system 200 may provide a distributed architecture for mobile streaming content delivery. In an example scenario, the first user 201 may desire to see a particular movie using the first user device 202. The first user 201 may send a request for the movie file using the first user device 202. The request for the movie file may be received, via the RAN 215, by the content controller server 223 of the hardware element 220. The content satellites 232, 233 may provide the content stream associated with the movie file directly to the hardware element 220 without the content stream having to pass through a master head end facility 105, other similar facility, a fiber distribution network, or any combination thereof. The content stream from the content satellites 232, 233 may be received by the hardware element 220 via the satellite receive antenna 221. The content controller server 223 may receive the incoming stream associated with the movie file from the satellite receive antenna 221.

Once the content controller server 223 receives the content stream associated with the movie file, the content controller server 223 may format the content for delivery to the first user device 202. The content stream, for example, may be formatted into a channel lineup or other desired format. Once formatted, the content stream may be provided to the first user device 202 by the content controller server 223. In certain embodiments, the formatted content stream may be provided to the first user device 202 using the cellular network antenna 222 of the hardware element 220 and the RAN 215. The first user device 202 may access the formatted content stream using the first user device 202 and may then watch the movie provided in the content stream. In certain embodiments, the content controller server 223 may also facilitate delivering a requested content stream along with voice data services to the first user device 202. For example, the content controller server 223 may jointly deliver the movie file, along with supporting voice data services associated with a phone call that the first user 201 is having with the second user 210.

Notably, as shown in FIG. 2, the system 200 may perform any of the operative functions disclosed herein by utilizing the processing capabilities of server 260, the storage capacity of the database 255, or any other component of the system 200 to perform the operative functions disclosed herein. The server 260 may include one or more processors 262 that may be configured to process any of the various functions of the system 200. The processors 262 may be software, hardware, or a combination of hardware and software. Additionally, the server 260 may also include a memory 261, which stores instructions that the processors 262 may execute to perform various operations of the system 200. For example, the server 260 may assist in processing loads handled by the various devices in the system 200, such as, but not limited to, receiving content streams directly from content satellites 232, 233, formatting a content stream into a format suitable for delivery to a subscriber device, receiving a request to access the content stream, delivering the formatted content stream to the subscriber device in response to the request to access the content, and performing any other suitable operations conducted in the system 200 or otherwise. In one embodiment, multiple servers 260 may be utilized to process the functions of the system 200. The server 260 and other devices in the system 200, may utilize the database 255 for storing data about the devices in the system 200 or any other information that is associated with the system 200. In one embodiment, multiple databases 255 may be utilized to store data in the system 200.

Although FIGS. 2-4 illustrate specific example configurations of the various components of the system 200, the system 200 may include any configuration of the components, which may include using a greater or lesser number of the components. For example, the system 200 is illustratively shown as including a first user device 202, a second user device 211, a RAN 215, cell sites 218, hardware elements 220, an EPC network 225, a cellular network antenna 222, a content controller server 223, a satellite network 230, content satellites 232, 233, a communications network 235, a server 240, a server 260, and a database 255. However, the system 200 may include any number of first user devices 201, any number of second user devices 211, any number of RANs 215, any number of cell sites 218, any number of hardware elements 220, any number of EPC networks 225, any number of cellular network antennas 222, any number of content controller servers 223, any number of satellite networks 230, any number of content satellites, 232, 233, any number of communications networks 235, any number of servers 240, 260, any number of databases 255, or any number of any of the other components in the system 200. Furthermore, in certain embodiments, substantial portions of the functionality and operations of the system 200 may be performed by other networks and systems that may be connected to system 200.

Figure 5:
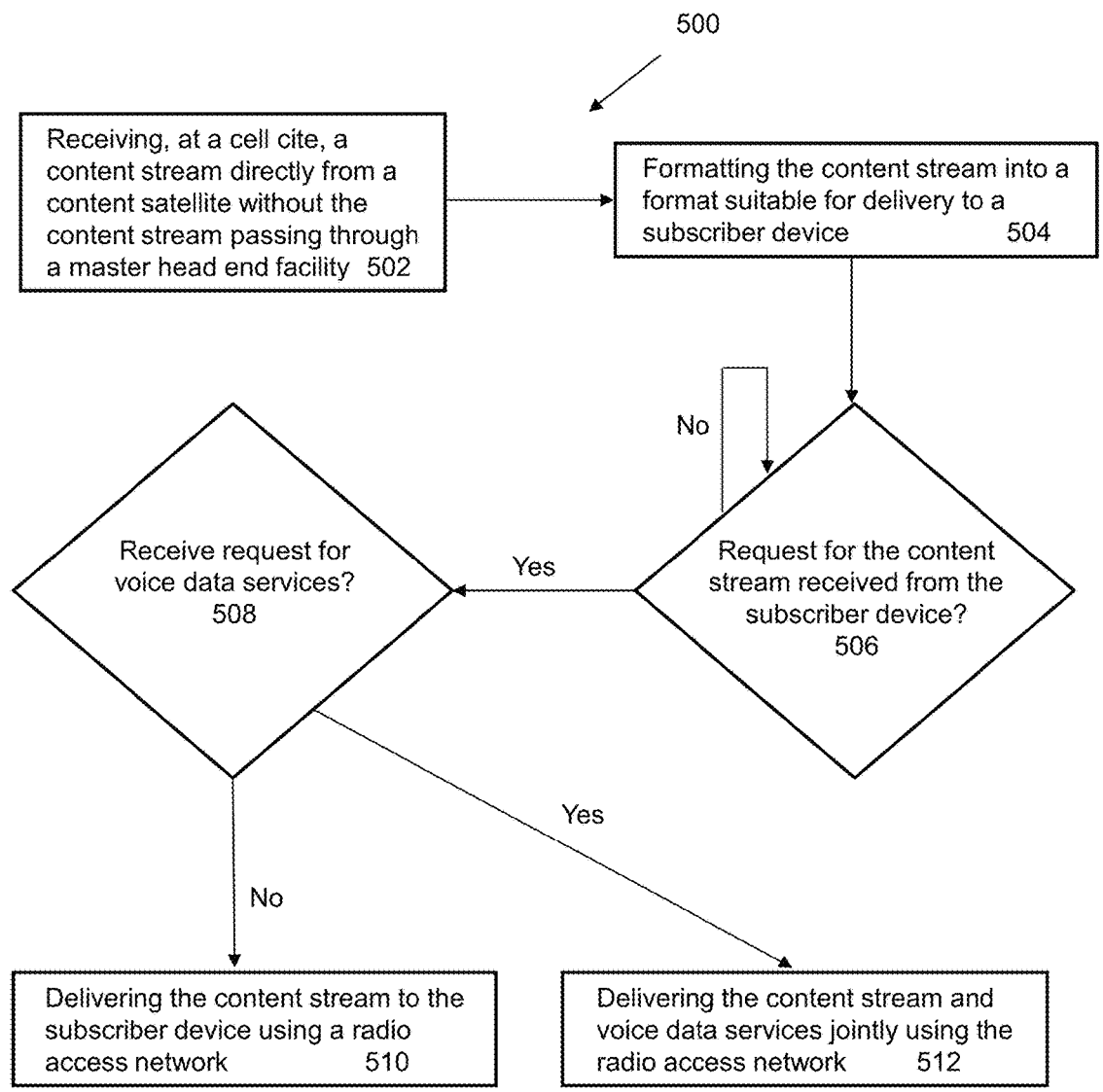
FIG. 5 is a flow diagram illustrating a sample method for providing a distributed architecture for mobile streaming content delivery according to an embodiment of the present disclosure.

As shown in FIG. 5, an exemplary method 500 for providing a distributed architecture for mobile streaming content delivery is schematically illustrated, and may include, at step 502, receiving, at a cell site 218, a content stream directly from a content satellite 232, 233. Notably, the content stream may be received from the content satellites 232, 233 without the content stream having to pass through a master head end facility 105. In certain embodiments, the content stream may be transmitted by the content satellites 232, 233, the satellite network 230, any combination thereof, or by any other appropriate device or network, to the cell site 218. The content stream may be received by the satellite receive antenna 221 of the hardware element 220 located at the cell site 218. At step 504, the method 500 may include formatting the content stream into a format suitable for delivery to a subscriber device, such as first user device 102. For example, the content stream may be formatted into a channel lineup or into any other desired format for delivery to one or more subscriber devices. In certain embodiments, the formatting of the content stream may be performed by utilizing the content controller server 223, the content satellites 232, 233, the server 240, the server 260, any combination thereof, or by any other appropriate device.

At step 506, the method 500 may include determining if a request to access the content stream has been received. In certain embodiments, the determination may be performed by utilizing the RAN 215, the cellular network antenna 222, the content controller server 223, the hardware element 220, the server 240, the server 260, any combination thereof, or by any other appropriate device. If a request to access the content stream has not been received, the method 500 may include repeating step 506 until a request is received. When a request has been received, the method 500 may include, at step 508, determining if a request for voice data services has been received from a device, such as a subscriber device. For example, the first user device 202 may attempt to initiate a voice call with the second user device 211. In certain embodiments, the request for the voice data services may be sent by the first user device 202, the second user device 211, any combination thereof, or by any other appropriate device. Also, in certain embodiments, the determination as to whether a request for voice data services has been received may be performed by utilizing the cellular network antenna 222, the content controller server 223, the hardware element 220, any combination thereof, or by any other appropriate device.

If the request for voice data services has not been received, the method 500 may include, at step 510, delivering, via the RAN 215, the formatted content stream to the subscriber device so that a user may access and interact with the content stream. In certain embodiments, the formatted content stream may be delivered by utilizing the content controller server 223, the cellular network antenna 222, the hardware element 220, the cell site 218, any combination thereof, or by any other appropriate device. If, however, the request for the voice data services has been received, the method 500 may include, at step 512, jointly delivering, via the RAN 215, the formatted content stream and requested voice data services to the subscriber device so that a user may access the content stream and voice data services. In certain embodiments, the formatted content stream and voice data services may be delivered by the content controller server 223, the cellular network antenna 222, the hardware element 220, the cell site 218, any combination thereof, or by any other appropriate device. When the content stream and/or voice data services are delivered to the subscriber device, the subscriber device may enable a user to access the content and voice data services.

Notably, the system 200 and methods disclosed herein may include additional functionality and features. For example, in certain embodiments, the system 200 and methods may include delivering the content streams by sharing the same Long-Term Evolution coverage, network infrastructure, and radio-frequency spectrum utilized by the first and second user devices 202, 211. Additionally, in certain embodiments, if a Single Frequency Network (SFN) architecture of enhanced Multimedia Broadcast and Multicast Service (eMBMS) is utilized with the system 200, the systems and methods may include utilizing symbol synchronization of transmissions occurring within the SFN so as to eliminate intercell interference that may be caused by the use of a single cell site frequency. Also, when utilizing the SFN architecture, the systems and methods may include utilizing a buffer ring of cell sites 218 to avoid potential interference around each SFN cluster utilized in the system 200.

If either a SFN architecture, unicast architecture, or both, are utilized with the system 200 and methods, the system 200 and methods may also include tagging frames of the content stream, along with synchronization, to ensure that each exact frame of the content stream may be delivered to adjacent cell sites 218 at the same time. Frame tagging and synchronization may be utilized to prevent content glare and shadowing that may be associated with the content stream. In certain embodiments, the content controller server 223 may be integrated into the RAN 215. For example, the content controller server 223 may be integrated into a Long Term Evolution RAN scheduler or other scheduler, into Long Term Evolution facilities, or both. In certain embodiments, the content streams may be formatted according to Orthogonal Frequency-Division Multiple Access configurations. In certain embodiments, the system 200 and methods may be utilized to increase management flexibility in software defined networks (SDNs) and network function virtualization (NFV). In certain embodiments, the system 200 and methods may be configured to share Long Term Evolution system capacity on demand, and may be utilized to replace ground repeater systems complemented in satellite broadcasting in urban and suburban environments.

The system 200 and methods may also include enabling the content satellites 232, 233 to format the content stream, such as into a channel lineup, prior to transmitting the content stream to the cell site 218. Additionally, in certain embodiments, the content satellites 232, 233 may be configured to perform other operative functions performed by the content controller server 223 or other devices in the system 200.

Figure 6:
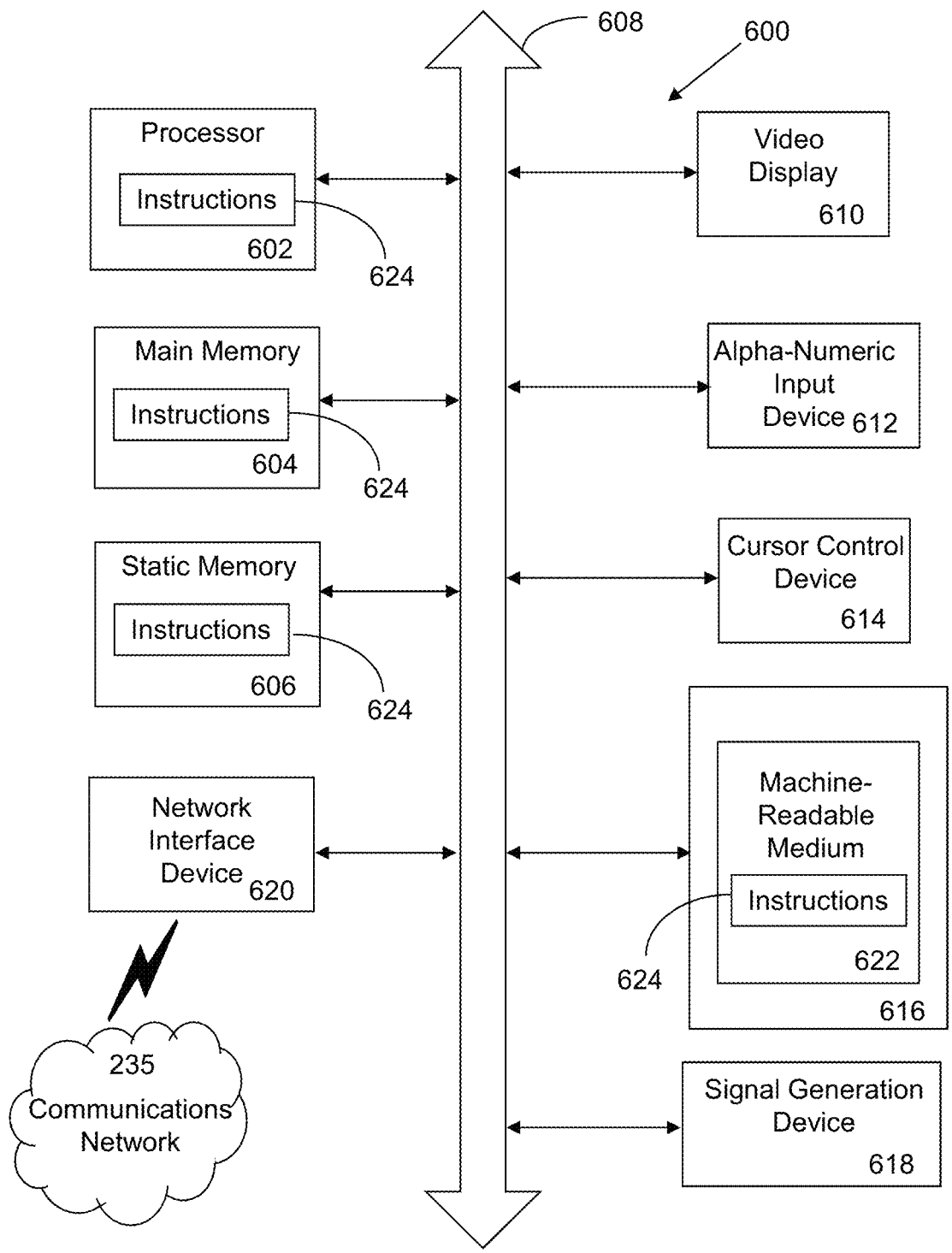
FIG. 6 is a schematic diagram of a machine in the form of a computer system within which a set of instructions, when executed, may cause the machine to perform any one or more of the methodologies or operations of the systems and methods for providing a distributed architecture for mobile streaming content delivery.

Referring now also to FIG. 6, at least a portion of the methodologies and techniques described with respect to the exemplary embodiments of the system 200 can incorporate a machine, such as, but not limited to, computer system 600, or other computing device within which a set of instructions, when executed, may cause the machine to perform any one or more of the methodologies or functions discussed above. The machine may be configured to facilitate various operations conducted by the system 200. For example, the machine may be configured to, but is not limited to, assist the system 200 by providing processing power to assist with processing loads experienced in the system 200, by providing storage capacity for storing instructions or data traversing the system 200, or by assisting with any other operations conducted by or within the system 200.

In some embodiments, the machine may operate as a standalone device. In some embodiments, the machine may be connected (e.g., using EPC network 225, satellite network 230, communications network 235, RAN 215, another network, or a combination thereof) to and assist with operations performed by other machines and systems, such as, but not limited to, the first user device 202, the second user device 211, the hardware element 220, the satellites 232, 233, the server 240, the database 255, the server 260, or any combination thereof. The machine may be connected with any component in the system 200. In a networked deployment, the machine may operate in the capacity of a server or a client user machine in a server-client user network environment, or as a peer machine in a peer-to-peer (or distributed) network environment. The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 600 may include a processor 602 (e.g., a central processing unit (CPU), a graphics processing unit (GPU, or both), a main memory 604 and a static memory 606, which communicate with each other via a bus 608. The computer system 600 may further include a video display unit 610, which may be, but is not limited to, a liquid crystal display (LCD), a flat panel, a solid state display, or a cathode ray tube (CRT). The computer system 600 may include an input device 612, such as, but not limited to, a keyboard, a cursor control device 614, such as, but not limited to, a mouse, a disk drive unit 616, a signal generation device 618, such as, but not limited to, a speaker or remote control, and a network interface device 620.

The disk drive unit 616 may include a machine-readable medium 622 on which is stored one or more sets of instructions 624, such as, but not limited to, software embodying any one or more of the methodologies or functions described herein, including those methods illustrated above. The instructions 624 may also reside, completely or at least partially, within the main memory 604, the static memory 606, or within the processor 602, or a combination thereof, during execution thereof by the computer system 600. The main memory 604 and the processor 602 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine-readable medium 622 containing instructions 624 so that a device connected to the EPC network 225, satellite network 230, communications network 235, RAN 215, another network, or a combination thereof, can send or receive voice, video or data, and to communicate over the EPC network 225, satellite network 230, communications network 235, RAN 215, another network, or a combination thereof, using the instructions. The instructions 624 may further be transmitted or received over the EPC network 225, satellite network 230, communications network 235, RAN 215, another network, or a combination thereof, via the network interface device 620.

While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that causes the machine to perform any one or more of the methodologies of the present disclosure.

The terms "machine-readable medium," "machine-readable device, or "computer-readable device" shall accordingly be taken to include, but not be limited to: memory devices, solid-state memories such as a memory card or other package that houses one or more read-only (non-volatile) memories, random access memories, or other re-writable (volatile) memories; magneto-optical or optical medium such as a disk or tape; or other self-contained information archive or set of archives is considered a distribution medium equivalent to a tangible storage medium. The "machine-readable medium," "machine-readable device," or "computer-readable device" may be non-transitory, and, in certain embodiments, may not include a wave or signal per se. Accordingly, the disclosure is considered to include any one or more of a machine-readable medium or a distribution medium, as listed herein and including art-recognized equivalents and successor media, in which the software implementations herein are stored.

The illustrations of arrangements described herein are intended to provide a general understanding of the structure of various embodiments, and they are not intended to serve as a complete description of all the elements and features of apparatus and systems that might make use of the structures described herein. Other arrangements may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Thus, although specific arrangements have been illustrated and described herein, it should be appreciated that any arrangement calculated to achieve the same purpose may be substituted for the specific arrangement shown. This disclosure is intended to cover any and all adaptations or variations of various embodiments and arrangements of the invention. Combinations of the above arrangements, and other arrangements not specifically described herein, will be apparent to those of skill in the art upon reviewing the above description. Therefore, it is intended that the disclosure not be limited to the particular arrangement(s) disclosed as the best mode contemplated for carrying out this invention, but that the invention will include all embodiments and arrangements falling within the scope of the appended claims.

The foregoing is provided for purposes of illustrating, explaining, and describing embodiments of this invention. Modifications and adaptations to these embodiments will be apparent to those skilled in the art and may be made without departing from the scope or spirit of this invention. Upon reviewing the aforementioned embodiments, it would be evident to an artisan with ordinary skill in the art that said embodiments can be modified, reduced, or enhanced without departing from the scope and spirit of the claims described below.

We claim:

1. A system, comprising:
a memory that stores instructions; and
a processor that executes the instructions to perform operations, the operations comprising:
receiving, at a satellite receive antenna included within a hardware element residing within a cell site, a content stream directly from a content satellite, wherein the content stream is received from the content satellite without passing through a master head end facility;
formatting the content stream received from the content satellite into a format suitable for delivery to a subscriber device, wherein the content stream is further formatted based on a content type of the content stream, wherein the content stream is formatted by utilizing a content controller server housed within a cell site cabinet of the hardware element located at the cell site, wherein the content stream is received by the content controller server from the satellite receive antenna included within the hardware element residing within the cell site;
tagging frames of the content stream to prevent content glare and shadowing associated with the content stream;
utilizing a buffer ring of cell sites including the cell site to avoid interference around a cluster of cell sites;
receiving, from the subscriber device, a request to access the content stream, wherein the request to access the content stream is received via a radio access network; and
delivering, to the subscriber device and via the radio access network, the content stream having the format suitable for delivery to the subscriber device in response to the request.

2. The system of claim 1, wherein the operations further comprise formatting the content stream into the format suitable for delivery to the subscriber device by formatting the content stream into a channel lineup.

3. The system of claim 2, wherein the operations further comprise merging the content stream and the channel lineup with voice data services associated with the subscriber device.

4. The system of claim 3, wherein the operations further comprise jointly delivering, via the radio access network, the content stream, the channel lineup, and the voice data services to the subscriber device via the radio access network.

5. The system of claim 1, wherein the operations further comprise receiving the content stream from the content satellite without the content stream having to pass through a fiber distribution network.

6. The system of claim 1, wherein the operations further comprise formatting the content stream into an orthogonal frequency division multiple access configuration so as to enable access for a plurality of subscriber devices.

7. The system of claim 1, wherein the operations further comprise utilizing symbol synchronization to eliminate inter-cell interference occurring in the system when a single frequency network architecture is utilized for the system.

8. The system of claim 1, wherein the operations further comprise utilizing frame tagging on the content stream to ensure each frame of the content stream is delivered to adjacent cell sites at the same time.

9. A method, comprising:
receiving, at a satellite receive antenna included within a hardware element residing within a cell site, a content stream directly from a content satellite, wherein the content stream is received from the content satellite without passing through a master head end facility;
formatting, by utilizing instructions from memory that are executed by a processor, the content stream received from the content satellite into a format suitable for delivery to a subscriber device, wherein the content stream is further formatted based on a content type of the content stream, wherein the content stream is formatted by utilizing a content controller server housed within a cell site cabinet of the hardware element located at the cell site, wherein the content stream is received by the content controller server from the satellite receive antenna included within the hardware element residing within the cell site;
tagging frames of the content stream to prevent content glare and shadowing associated with the content stream;
utilizing a buffer ring of cell sites including the cell site to avoid interference around a cluster of cell sites;

receiving, from the subscriber device, a request to access the content stream, wherein the request to access the content stream is received via a radio access network; and delivering, to the subscriber device and via the radio access network, the content stream having the format suitable for delivery to the subscriber device in response to the request.

10. The method of claim 9, further comprising formatting the content stream into the format suitable for delivery to the subscriber device by formatting the content stream into a channel lineup.

11. The method of claim 10, further comprising merging the content stream and the channel lineup with voice data services associated with the subscriber device.

12. The method of claim 11, further comprising jointly delivering, via the radio access network, the content stream, the channel lineup, and the voice data services to the subscriber device via the radio access network.

13. The method of claim 9, further comprising receiving the content stream from the content satellite without the content stream having to pass through a terrestrial distribution network.

14. The method of claim 9, further comprising utilizing a unicast architecture that enables the content stream to share radio resources with other data content.

15. The method of claim 14, further comprising, while utilizing the unicast architecture, tagging frames in the content stream to ensure each frame of the content stream is delivered to adjacent cell sites at the same time.

16. The method of claim 9, further comprising formatting the content stream into an orthogonal frequency division multiple access configuration so as to enable access for a plurality of subscriber devices.

17. The method of claim 9, further comprising utilizing symbol synchronization to eliminate inter-cell interference when utilizing a single frequency network architecture.

18. A computer-readable device comprising instructions, which when executed by a processor, cause the processor to perform operations comprising:

receiving, at a satellite receive antenna included within a hardware element residing within a cell site, a content stream directly from a content satellite, wherein the content stream is received from the content satellite without passing through a master head end facility;

formatting the content stream received from the content satellite into a format suitable for delivery to a subscriber device, wherein the content stream is further formatted based on a content type of the content stream, wherein the content stream is formatted by utilizing a content controller server housed within a cell site cabinet of the hardware element located at the cell site, wherein the content stream is received by the content controller server from the satellite receive antenna included within the hardware element residing within the cell site;

tagging frames of the content stream to prevent content glare and shadowing associated with the content stream;

utilizing a buffer ring of cell sites including the cell site to avoid interference around a cluster of cell sites;

receiving, from the subscriber device, a request to access the content stream, wherein the request to access the content stream is received via a radio access network; and delivering, to the subscriber device and via the radio access network, the content stream having the format suitable for delivery to the subscriber device in response to the request.

19. The computer-readable device of claim 18, wherein the operations further comprise formatting the content stream into the format suitable for delivery to the subscriber device by formatting the content stream into a channel lineup.

20. The computer-readable device of claim 19, wherein the operations further comprise merging the content stream and the channel lineup with voice data services associated with the subscriber device.

* * * * *